Dec. 25, 1962  W. H. LOY ETAL  3,070,028
AIR ELIMINATOR FOR ROTARY MECHANICAL SEALS IN FLUID PUMPS
Filed May 8, 1961

Inventor
Walter H. Loy and
Ira A. Goetsch
By Mann, Brown & McWilliams
Attys.

United States Patent Office 3,070,028
Patented Dec. 25, 1962

3,070,028
AIR ELIMINATOR FOR ROTARY MECHANICAL
SEALS IN FLUID PUMPS
Walter H. Loy, Arlington Heights, and Ira A. Goetsch,
Northbrook, Ill., assignors to Bell & Gossett Company,
a corporation of Illinois
Filed May 8, 1961, Ser. No. 108,449
5 Claims. (Cl. 103—111)

This invention relates to rotary mechanical pump seals and more particularly is concerned with evacuating air from the seal cavity of centrifugal pumps to permit the liquid being pumped to continuously contact and lubricate the rotary mechanical seal disposed in the seal cavity.

When air or other compressible gas is permitted to collect and remain in the seal cavity, the rotation of the pump shaft sets up a centrifuging action, driving any liquid in the seal cavity in an outwardly swirling path and this creates a central gas pocket surrounding and thermally isolating the mechanical seal. The presence of the gas pocket prevents the heat generated at the seal from being carried away and thus permits overheating to occur at the seal. Moreover, this overheating of the seal is accelerated because the presence of the gas pocket deprives the seal of the beneficial lubrication normally derived from contact with the liquid being pumped.

Instances where seal failures are attributable to formation of gas pockets in the seal cavity include self-priming pump applications where air at the suction side of the pump tends to be drawn into the seal cavity and to remain there throughout the priming cycle and even afterward and pump applications where the liquid being handled is heavily gas or air laden and/or readily vaporizable such that the liquid in the seal well releases sufficient gas air or vapor to create a pocket around the seal.

The principal object of the present invention is to provide an internal baffle arrangement in a pump seal cavity that continually acts to establish a separate evacuation path for air or other compressible gases collecting in the seal cavity and to establish a separate return flow path for the liquid being pumped to direct liquid into the seal cavity and into lubricating contact with the rotary mechanical seal.

Another object of the invention is the provision in the seal cavity of an annular baffle encircling the shaft and providing an effectively separated return flow path to the seal for liquid leaking from the pressure chamber of the pump and an effectively separated air evacuation path for moving air away from the seal and into the impeller which then discharges it to the pressure chamber.

Other objects and advantages will become apparent during the course of the following description.

In the accompanying drawings forming a part of this specification and in which like numerals are employed to designate like parts throughout the same;

Figure 1:
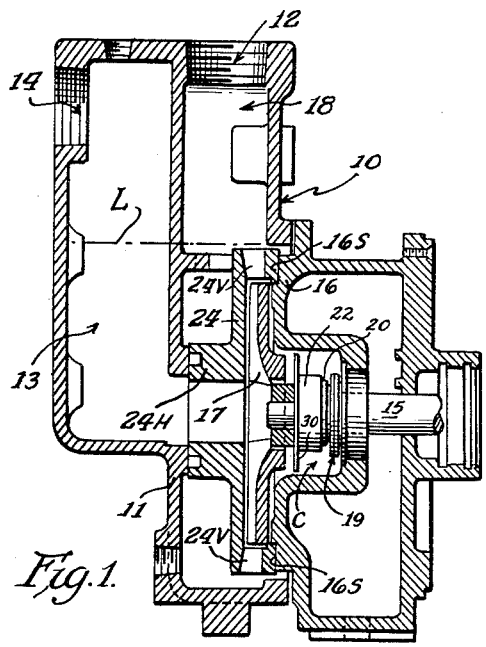
FIG. 1 is a vertical sectional view through a typical self-priming type of centrifugal pump incorporating the seal cavity air eliminating arrangement of this invention.

For purposes of illustrative disclosure, the invention is shown embodied in a self-priming diffuser type centrifugal pump that is designated generally at 10 in FIG. 1.

The pump includes a casing 11 having a discharge outlet 12 and having a suction passage 13 leading from a suction inlet 14. A rotatable drive shaft 15 extends through a seal plate 16 that constitutes one end wall of the casing 11 and is keyed to an impeller 17 that is rotatable in the casing to draw liquid through the inlet 14 and suction passage 13 for discharge into a pressure chamber 18 leading to the discharge outlet 12.

The seal plate 16 is shaped to provide a seal cavity C through which the rotatable shaft extends and a conventional rotary shaft seal assembly 19 is shown in the seal cavity in encircling relation to the shaft 15. The seal assembly includes a ring 20 fixed in an annular mechanical housing 22 that is keyed on the free end of the shaft inwardly of the impeller 17 and a ring 23 that is stationarily mounted from the rear of the seal plate through the spring and housing elements of the seal assembly 19.

The illustrated pump arrangement includes a diffuser element 24 disposed within the casing 11 and locatingly engaged by annular shoulder surfaces 16S of the seal plate. The diffuser has a hub portion 24H defining the terminal end of the suction passage 13 and includes a plurality of circumferentially spaced spiral vanes 24V encircling the periphery of the impeller for converting the turbulent discharge therefrom into a stream-like flow. The diffuser passages as defined by the vanes 24V are divergent to cause a transition from a velocity head to a pressure head.

When suction is broken on the inlet side, the illustrated pump arrangement is normally capable of maintaining a static reserve of liquid at the level indicated by the line designated L in FIG. 1. When the pump is then called upon to reprime, the initial rotation of the impeller 17 will draw off all the liquid present in the suction passage 13 and discharge it into the pressure chamber and air on the suction side will immediately be drawn in by the impeller. Some of this air collects in the seal cavity C and tends to remain there during the entire priming cycle and in many instances will remain during normal pump operation following completion of the priming cycle.

Figure 2:
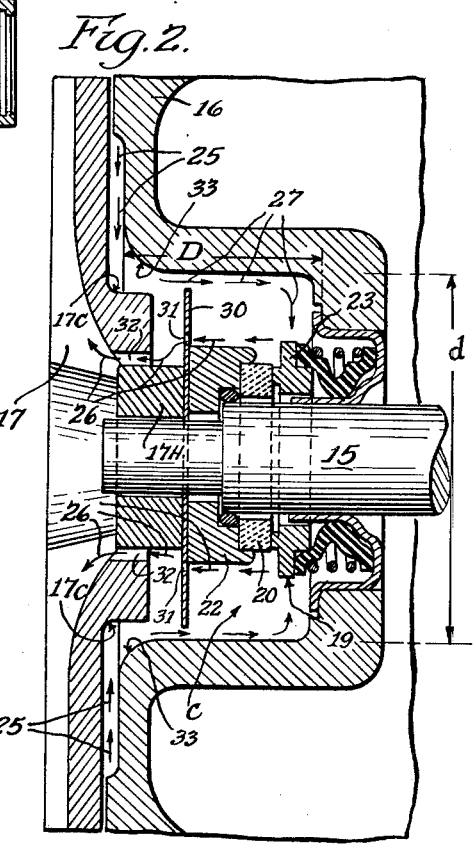
FIG. 2 is an enlarged fragmentary sectional view through the seal cavity region of the pumps of FIG. 1.

During priming and during normal operation of pumps of this type, liquid returns from the pressure side along leakage paths such as are indicated by the arrows designated 25 in FIG. 2 and it is important that this return flow of liquid actually contact the seal for properly removing the heat generated by friction between the seal rings 20 and 23. Such liquid contact is also important for lubricating the seal rings to minimize the quantity of heat generated.

Whenever an air or gas pocket is developed and permitted to remain in the seal cavity, it envelops the mechanical seal and excludes liquid in the seal cavity from contact with the seal. Under such circumstances the seal is not properly cooled and lubricated and this condition frequently leads to seal ring failure. The priming cycle of a pump is in many instances a critical period as respects this problem. It is contemplated that the invention might be used in other instances where the problem arises, such for example as in applications involving the pumping of high temperature water or other liquids which at high temperature are heavily laden with gas or air and in applications involving the pumping of volatile liquids which tend to release gas in the seal cavity because of the action of the heat generated locally at the seal.

In accordance with the present invention, a simplified baffle arrangement is provided in the seal cavity for creating an effectively separated evacuation path 26 for air or gas collecting therein and for creating an effectively separated return flow path 27 for liquid leaking along the path 25 back from the pressure side. Thus the returning liquid is made to flow into the seal cavity along a path 27 such that it tends to push the air out of the cavity along the evacuation path 26.

Figure 3:
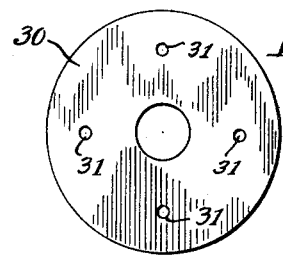
FIG. 3 is a face view of a baffle utilized in the seal cavity and illustrating the preferred location for the air evacuation holes therein.

For purposes of illustrative disclosure a specific embodiment of the presently preferred baffle arrangement is provided. The depth of the seal cavity C is indicated at D in FIG. 2 and the diameter of the seal cavity is indicated at d. A baffle 30, which is best shown in FIG. 3 is mounted on the shaft 15 between the ring housing 22 and impeller 17 and is located adjacent to the impeller end of the seal cavity C in order to properly divide and separate the air evacuation path 26 from the liquid return flow path 27.

Figure 4:
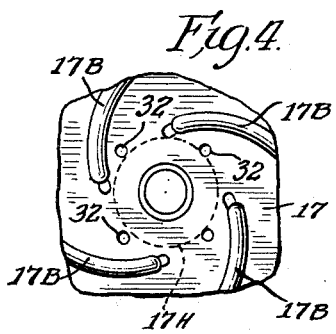
FIG. 4 is a face view of the hub region of the impeller and illustrating the preferred location for the air evacuation holes therein.

The baffle 30 is in the form of a circular disc as thin as is mechanically practicable, for example, it may be of 0.010" in thickness and it may be of any material compatible with the medium being pumped. The disc contains a number of holes 31 located on a diameter about the axis of the shaft that corresponds to but is slightly larger than the diameter of the housing 22, and the holes 31 are preferably equiangularly spaced about the axis of the shaft. The diameter of the disc is approximately 90% of the diameter d of the seal cavity and the disc is located at a point along the shaft axis that is approximately 25% of the depth of the seal cavity. At this location, the baffle most effectively divides the liquid path 27 from the air evacuation path 26. It will also be noted that the impeller 17, as is shown in FIG. 4, has a set of equiangularly spaced holes 32 straddling the nose of each impeller blade 17B and located immediately on the diameter of the impeller hob 17H. These holes 32 preferably correspond in number with the holes 31 to complete the air evacuation path 26.

In the preferred arrangement disclosed herein, the seal plate 16 is formed with its seal cavity C having a cast draft of 1/32" per inch, the impeller end being larger. In addition, the entrance corner 33 at the impeller end of the seal cavity has a minimum radius of 12½% of the seal cavity depth D and correspondingly the inside corner 17C of the impeller shroud should have a smoothly curving contour.

It will be appreciated that these specific relationships are given merely to disclose the presently preferred construction and not to limit the scope of the invention. The unique disc type baffle arrangement is still effective to divide the air evacuation path 26 from the return liquid flow path 27 when these relationships are altered to some extent and all such variations are contemplated within the scope of the present invention.

Figure 5:
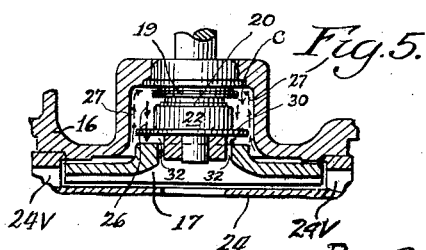
FIG. 5 is a view corresponding to that of FIG. 2 and illustrating that the air eliminator arrangement is also operable on vertical shaft pumps.

In FIGS. 1 to 4 a horizontal shaft pump is illustrated but it should be understood that the novel air eliminator structure is also effective with a vertical shaft pump as is illustrated in FIG. 5. The specific details in the arrangement and sizing of the baffle 30 are essentially the same as specified for the pump of FIGS. 1 to 4 and identical reference characters are employed for both arrangements. Under a variety of test conditions, it has been found that for both horizontal and vertical shaft types of pumps, all air is cleared from the pump cavity within six seconds.

It should be understood that the description of the preferred form of the invention is for the purpose of complying with section 112, title 35, of the United States Code, and that the appended claims should be construed as broadly as the prior art will permit.

What is claimed is:

1. In a centrifugal pump, said pump including a casing having a liquid inlet leading to a suction passage and a pressure chamber leading to a liquid outlet, said casing having wall structure bordering and defining a seal cavity communicating with said pressure chamber, with said wall structure having a central shaft opening, a rotatable shaft projecting through said opening and seal cavity and carrying an impeller for rotation in said casing, said impeller being rotatable in said casing to draw liquid through said suction passage and discharge it into said pressure chamber, a seal assembly in said seal cavity and including relatively rotatable seal rings encircling said shaft to provide a seal across said central shaft opening of said wall structure, said pump having a liquid leakage path existing between said impeller and said seal cavity wall structure, annular baffle structure disposed in the seal cavity in encircling relation to the shaft and adjacent the impeller end of the shaft, said baffle structure and said impeller having passages leading therethrough adjacent said shaft to provide an air evacuation path leading from said seal cavity to said impeller, and said baffle structure providing passages at the outer periphery of the seal cavity for directing liquid from said leakage path to said seal rings along a separate path leading into said seal cavity for assisting in expelling air along said evacuation path.

2. In a centrifugal pump, said pump including a casing having a liquid inlet leading to a suction passage and a pressure chamber leading to a liquid outlet, said casing having wall structure bordering and defining a seal cavity communicating with said pressure chamber, with said wall structure having a central shaft opening, a rotatable shaft projecting through said opening and seal cavity and carrying an impeller for rotation in said casing, said impeller being rotatable in said casing to draw liquid through said suction passage and discharge it into said pressure chamber, a seal assembly in said seal cavity and including relatively rotatable seal rings encircling said shaft to provide a seal across said central shaft opening of said wall structure, said pump having a liquid leakage path existing between said impeller and said seal cavity wall structure, annular baffle structure disposed in the seal cavity in encircling relation to the shaft and comprising a disc fixed on the shaft between said impeller and said seal assembly and located adjacent the impeller end of the shaft, said disc and said impeller having axial passages leading therethrough adjacent said shaft to provide an air evacuation path leading from said seal cavity to said impeller, and said disc being of a diameter less than the seal cavity to provide an annular passage at the outer periphery of the seal cavity for directing liquid from said leakage path to said seal rings along a separate path leading into said seal cavity.

3. In a centrifugal pump, said pump including a casing having a liquid inlet leading to a suction passage and a pressure chamber leading to a liquid outlet, said casing including a seal plate bordering said pressure chamber and having wall structure providing a seal cavity communicating with said pressure chamber, with said wall structure having a central shaft opening, a rotatable shaft projecting through said opening and seal cavity and carrying an impeller for rotation in said casing, said impeller being rotatable in said casing to draw liquid through said suction passage and discharge it into said pressure chamber, a seal assembly in said seal cavity and including relatively rotatable seal rings encircling said shaft to provide a seal across said central shaft opening of said wall structure, said impeller having a shroud adjacent said seal cavity wall with a liquid leakage path existing therebetween, annular baffle structure disposed in the seal cavity in encircling relation to the shaft and adjacent the impeller end of the shaft, said baffle structure providing clearance at the outer periphery of the seal cavity for directing liquid from said leakage path to said seal rings and said baffle structure and said impeller having passages leading therethrough adjacent said shaft to provide an air evacuation path leading from said seal cavity to said impeller.

4. In a centrifugal pump, said pump including a casing having a liquid inlet leading to a suction passage and a pressure chamber leading to a liquid outlet, said casing including a seal plate bordering said pressure chamber and having wall structure providing a seal cavity communicating with said pressure chamber, with said wall structure having a central shaft opening, a rotatable shaft projecting through said opening and seal cavity and carrying an impeller for rotation in said casing, said impeller being rotatable in said casing to draw liquid through said suction passage and discharge it into said pressure chamber, a seal assembly in said seal cavity and including relatively rotatable seal rings encircling said shaft to provide a seal across said central shaft opening of said wall structure, said impeller having a shroud adjacent said seal cavity wall with a liquid leakage path existing therebetween, annular baffle structure disposed in the seal cavity in encircling relation to the shaft and adjacent the impeller end of the shaft, said baffle structure comprising a disc fixedly mounted on said shaft between said impeller and said seal assembly and providing clearance substantially throughout an annular clearance at the outer periphery of the seal cavity for directing liquid from said leakage path to said seal rings, and said baffle structure and said impeller having passages leading therethrough adjacent said shaft to provide an air evacuation path leading from said seal cavity to said impeller.

5. The arrangement of claim 2 wherein the diameter of said disc is approximately 90 percent of the diameter of the seal cavity and the disc is disposed at a location along the shaft that is approximately 25 percent of the depth of the seal cavity.

References Cited in the file of this patent

UNITED STATES PATENTS

| | | |
|---|---|---|
| 1,967,316 | Meeker | July 24, 1934 |
| 2,642,004 | Bergh | June 16, 1953 |
| 2,671,406 | Waller | Mar. 9, 1954 |

FOREIGN PATENTS

| | | |
|---|---|---|
| 212,879 | Great Britain | of 1925 |
| 585,915 | France | Dec. 19, 1934 |